April 8, 1958   B. F. BRUNGES, JR   2,830,286
TEMPERATURE MEASURING AND METAL FATIGUE INDICATING MEANS
Filed June 25, 1956
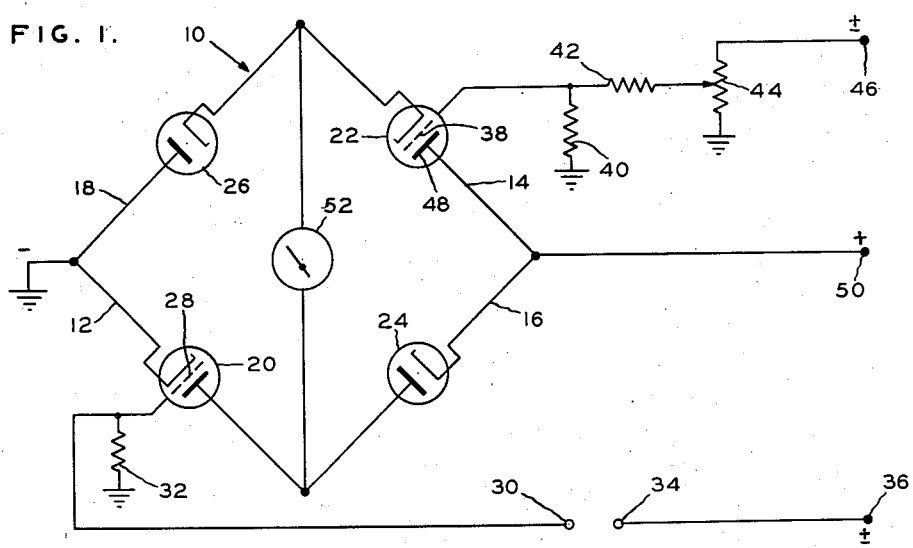
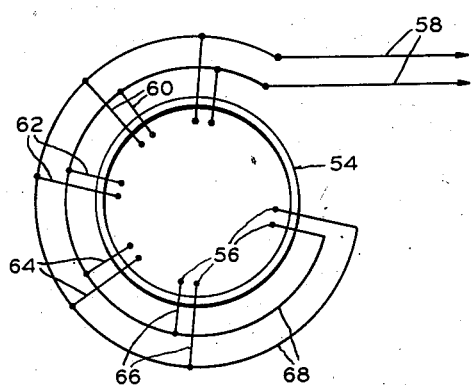
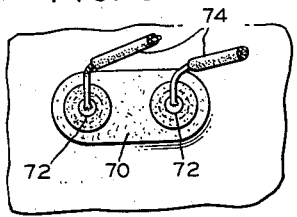
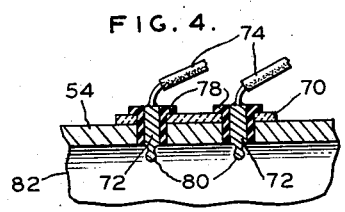
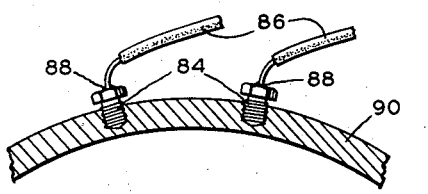
INVENTOR
BENJAMIN F. BRUNGES, JR.
BY
ATTORNEY United States Patent Office 2,830,286
Patented Apr. 8, 1958

2,830,286

TEMPERATURE MEASURING AND METAL FATIGUE INDICATING MEANS

Benjamin F. Brunges, Jr., Sioux City, Iowa

Application June 25, 1956, Serial No. 593,738

8 Claims. (Cl. 340—233)

This invention relates to an indicating and measuring means, and it particularly relates to a means for measuring temperature and indicating fatigue in metals.

One of the primary disadvantages of most presently used temperature measuring devices is the fact that their accuracy is affected by the ambient temperature of the environment. A further disadvantage of such devices, which generally take the form of junction-type thermocouples, is the high cost of replacement parts.

It is, therefore, one object of the present invention to provide a temperature measuring device the accuracy of which is not affected by the ambient temperature.

Another object of the present invention is to provide a temperature measuring device which has parts that can be replaced at relatively low cost.

Another object of the present invention is to provide a measuring and indicating system which is adapted to be used both for measuring temperature and for indicating metal fatigue.

Another object of the present invention is to provide a means for indicating metal fatigue in advance of visible indications to avoid rupture of metal parts during use.

Other objects of the present invention are to provide an improved measuring and indicating means, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which:

Fig. 1 is a schematic view of a system embodying the present invention.

Fig. 2 is a diagrammatic end view of the electrical hook-up of the system of Fig. 1 applied to an engine exhaust tube.

Fig. 3 is a top plan view of the temperature sensing elements mounted in place.

Fig. 4 is a longitudinal sectional view of the sensing elements mounted in place.

Fig. 5 is a cross-sectional view showing metal-fatigue sensing elements mounted in place.

Referring now in greater detail to the drawing wherein similar reference characters refere to similar parts, there is shown in Fig. 1 an electrical system which includes a modified Wheatstone bridge 10 having two variable legs 12 and 14 and two fixed legs 16 and 18. The variable legs include grid action devices such as triodes 20 and 22. It is also possible to substitute transistors for the triodes. The legs 16 and 18 may include either vacuum tube diodes, such as illustrated at 24 and 26, or crystal type diodes. The variable leg 14 is known as the "calibrating leg."

The grid 28 of triode 20 is connected to one terminal 30 of the sensing element through resistance 32. The other terminal 34 of the sensing element is spaced from terminal 30 and is connected to a source of power at 36.

The grid 38 of triode 22 is connected through grid resistor 40 and line resistor 42 to the movable element of a potentiometer 44. Power is supplied to the potentiometer 44 from a source connected to terminal 46. Plate voltage for plate 48 of triode 22 is supplied to terminal 50 from a source. A galvanometer 52, is connected across the bridge circuit to indicate any unbalancing of the circuit.

The potential applied to leg 14 is governed by the available voltage applied to grid 28 of tube 20 and is controlled by adjustment of the potentiometer 44. The potential applied to grid 28 is determined by a combination of several factors, such as the voltage applied to the sensing elements, the temperature being measured, the type of material of which the sensing elements are made, the spacing of the sensing elements from each other, and the voltage drop across resistance 32.

In operation, assuming a "cold start," that is, a temperature lower than the ionization point, the power is turned on and the required voltages are applied to the required points. The instrument is now ready for use. A potential is applied to grid 38 of tube 22 through potentiometer 44 which is adjusted until indicator 52 reads "zero." A potential is also applied to terminal 34 of the sensing element. However, current cannot flow until the temperature increases up to and beyond the predetermined ionization point between the terminals. When this current flows between the two terminals 34 and 30, a potential is applied to grid 28 of tube 20 and to resistance 32. The voltage drop across resistance 32 is applied to grid 28 and this causes the bridge to become unbalanced. This is immediately shown on indicator 52.

The above-described unit may be constructed in two or more parts, as required. However, the bridge and indicator assembly should be kept as close together as possible. The lines to the sources of power and to the sensing elements may be any desired length, but the resistances should preferably be kept low.

The system of Fig. 1 is shown applied to the exhaust tube 54 of a combustion engine. The lines 56 lead to the sensing element and the lines 58 lead to the indicator. The lines 60, 62, 64 and 66 lead to the various legs of the Wheatstone bridge. All the lead lines are connected to ring feed lines 68.

The actual elements used for sensing purposes are shown in Fig. 3. They include insulators 70, stud bolts 72 and wires 74 leading to the ring feed lines 68 illustrated in Fig. 2. The spacing between stud bolts 72 and their corresponding wires 74 is variable, depending on the particular application. A high temperature insulating sleeve 76 having a gas-tight seal 78 surrounds each stud bolt. A ball tip 80 extends from each sensing element into the heated area 82 of the exhaust tube 54.

In Fig. 5 there is illustrated a modification of the invention wherein the same circuit arrangement as is illustrated in Fig. 1 is used. However, the circuit is used to indicate the fatigue in a metal body.

The sensing elements used to indicate metal fatigue are indicated in Fig. 5 at 84. Each element 84 comprises a screw, constructed of the same material as the metal being tested. These screws are inserted into the wall of the metal body, here illustrated fragmentarily as a portion of an annular cylinder 90. The wires 86, which connect the screws 84 to the indicator circuit, are attached to the screws by welds 88 or other desirable means.

The operation of the fatigue-sensing arrangement is similar to that of the temperature-indicating arrangement except that the measuring instrument is calibrated when the operating temperatures of the body have been reached.

This adjustment is made only once, during the original installation of the body.

The device operates to indicate fatigue in the metal because metal changes its conductivity with age and oxidation resulting from constant heating and re-heating of the metal. In this manner, a change of conductivity or resistance can be measured very easily with this arrangement simply by using different applied potentials. Consequently, the arrangement can be used to forecast metal failure in advance, thereby preventing possibilities of rupture and explosion under operating conditions of heat and pressure.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A measuring device comprising a Wheatstone bridge circuit having a galvanometer-type indicator connected across its terminals, said bridge circuit having a pair of fixed legs and a pair of variable legs, each fixed leg including a diode and each variable leg including a triode, adjustable control means connected between a source of electrical energy outside the circuit and the grid element of one of said triodes to vary a voltage impressed thereon for the purpose of balancing said bridge circuit, and means connected to the grid element of the other triode for impressing a variable voltage thereon.

2. The device of claim 1 wherein said control means comprises a potentiometer connected, at one side, to a source of electrical energy and, at its other side, to the grid of said first-mentioned triode.

3. The device of claim 1 wherein said means for impressing a variable voltage comprises a pair of spaced terminals electrically interposed between a source of electrical energy and the grid of said other triode, the spacing between said terminals being so arranged that when electrical energy is applied to one of said terminals, current flow is prevented until a predetermined temperature is reached, at which time there is sufficient ionization between said terminals to cause current to flow to said other triode.

4. The device of claim 1 in combination with a pair of spaced thermally-conductive elements fixed in and insulated from the walls of a combustion chamber, said elements extending into the heated area of said combustion chamber and being electrically connected to said bridge circuit, one of said elements being connected to a source of electrical energy and the other being connected to the other triode, said elements forming sensing elements included in said means for impressing a variable voltage, said elements acting as a valve to prevent flow of electrical energy to said other triode until a sufficient ionization occurs between said elements, such sufficient ionization being arranged to occur when a predetermined temperature is reached between said elements.

5. The device of claim 1 wherein said means for impressing a variable voltage comprises a pair of spaced metal inserts fixed in the wall of a metal body, said inserts being constructed of the same material as said body, one of said inserts being connected to a source of electrical energy, and the other of said inserts being electrically connected to said other triode, said inserts acting as a valve to prevent the flow of electrical energy therebetween until a predetermined temperature is reached, sufficient to cause sufficient ionization therebetween to permit the flow of electrical energy.

6. In combination with a Wheatstone bridge circuit having a variable electronic means on one leg thereof, means for impressing a variable potential on said electronic means, said means for impressing a variable potential including a pair of electrodes, spaced from each other by a predetermined amount, a source of electrical energy connected to one of said electrodes, and the other of said electrodes being electrically connected to said electronic means.

7. The combination of claim 6 wherein said electrodes are provided with electrical and heat insulating means and are also provided with protruding sensing portions.

8. The combination of claim 6 wherein said electrodes are metal screws of a predetermined metallic composition.

References Cited in the file of this patent

UNITED STATES PATENTS

| | | |
|---|---|---|
| 2,329,073 | Mitchell, et al. | Sept. 7, 1943 |
| 2,498,103 | Wojciechowski | Feb. 21, 1950 |
| 2,356,733 | Banker | Aug. 29, 1954 |
| 2,728,028 | Carpenter | Dec. 20, 1955 |
| 2,759,174 | Brailsford | Aug. 14, 1956 |